United States Patent
Baumann

(10) Patent No.: US 8,491,040 B2
(45) Date of Patent: Jul. 23, 2013

(54) PASSENGER CAR WITH A TRANSVERSE ELEMENT THAT IS ASSOCIATED WITH A VEHICLE SEAT

(75) Inventor: Karl-Heinz Baumann, Bondorf (DE)

(73) Assignee: Daimler AG, Stuttgart (DE)

( * ) Notice: Subject to any disclaimer, the term of this patent is extended or adjusted under 35 U.S.C. 154(b) by 160 days.

(21) Appl. No.: 12/809,013

(22) PCT Filed: Nov. 26, 2008

(86) PCT No.: PCT/EP2008/010009
§ 371 (c)(1),
(2), (4) Date: Sep. 21, 2010

(87) PCT Pub. No.: WO2009/077066
PCT Pub. Date: Jun. 25, 2009

(65) Prior Publication Data
US 2011/0031780 A1     Feb. 10, 2011

(30) Foreign Application Priority Data

Dec. 19, 2007 (DE) .......................... 10 2007 061 207

(51) Int. Cl.
*B60N 2/427* (2006.01)
*B62D 21/15* (2006.01)
*B62D 25/00* (2006.01)

(52) U.S. Cl.
USPC .................................................. 296/187.12

(58) Field of Classification Search
USPC ................... 296/187.12, 187.03, 146.6, 68.1, 296/193.05, 203.03, 193.02
See application file for complete search history.

(56) References Cited

U.S. PATENT DOCUMENTS

| | | | | |
|---|---|---|---|---|
| 2,561,091 A * | 7/1951 | Bell | ............... | 297/423.15 |
| 3,982,787 A * | 9/1976 | Moll | ............... | 297/317 |
| 4,606,429 A * | 8/1986 | Kurata | ............... | 180/292 |
| 5,343,974 A * | 9/1994 | Rabek | ............... | 180/216 |
| 5,435,618 A | 7/1995 | Sacco et al. | | |
| 5,820,204 A * | 10/1998 | Masuda et al. | ............... | 296/187.12 |
| 5,954,390 A * | 9/1999 | Kleinhoffer et al. | ............... | 296/203.01 |
| 5,961,135 A * | 10/1999 | Smock | ............... | 280/124.11 |
| 6,375,266 B1 | 4/2002 | Ferguson et al. | | |

(Continued)

FOREIGN PATENT DOCUMENTS

| DE | 43 02 505 A1 | 8/1994 |
|---|---|---|
| DE | 196 38 005 A1 | 3/1998 |
| DE | 101 43 881 A1 | 3/2003 |
| DE | 10 2004 012 500 A1 | 10/2005 |

OTHER PUBLICATIONS

International Search Report including English translation dated Mar. 5, 2009 and PCT/ISA/237 Form Sixteen (16) pages.

*Primary Examiner* — Glenn Dayoan
*Assistant Examiner* — Sunsurraye Westbrook
(74) *Attorney, Agent, or Firm* — Crowell & Moring LLP

(57) ABSTRACT

A passenger car with a transverse element that is associated with a vehicle seat and that has a non-deformable center region and deformable outer regions, is supported on respective ends thereof on associated body regions in the transverse direction of the vehicle. The transverse element is supported on respective ends thereof on associated side skirts. The vehicle seat is arranged in a vehicle center and is movable along with the center region following a crash-induced length reduction of an outer region facing a side impact force which causes a length reduction of the outer region facing away from the side impact force.

19 Claims, 3 Drawing Sheets

U.S. PATENT DOCUMENTS

| | | | |
|---|---|---|---|
| 6,568,745 B2 * | 5/2003 | Kosuge et al. | 296/193.02 |
| 6,786,534 B1 * | 9/2004 | Peng | 296/187.08 |
| 6,857,692 B2 * | 2/2005 | Cardimen et al. | 296/204 |
| 2002/0153749 A1 * | 10/2002 | Lee | 296/204 |
| 2004/0129489 A1 * | 7/2004 | Brasseal et al. | 180/350 |
| 2006/0267379 A1 * | 11/2006 | Johnson | 296/190.08 |

\* cited by examiner

PASSENGER CAR WITH A TRANSVERSE ELEMENT THAT IS ASSOCIATED WITH A VEHICLE SEAT

This application is a national stage of PCT International Application No. PCT/EP2008/010009, filed Nov. 26, 2008, which claims priority under 35 U.S.C. §119 to German Patent Application No. 10 2007 061 207.0, filed Dec. 19, 2007, the entire disclosure of which is herein expressly incorporated by reference.

BACKGROUND AND SUMMARY OF THE INVENTION

The invention relates to a passenger car with a transverse element that is associated with a vehicle seat, and has a non-deformable center region, as well as deformable extremities.

Such a passenger car is for example already known from German patent document DE 101 43 881 B4 and comprises a transverse element, on which the vehicle seat rests. In addition to a non-deformable center region, the transverse element comprises two deformable outer regions, via which the transverse element is supported at a side skirt arranged on the outer side and a center tunnel arranged in the vehicle center.

If the passenger car is now impacted by a corresponding crash-induced force acting in the transverse vehicle direction towards the vehicle center, the outer region of the transverse element which is arranged facing the vehicle center or the center tunnel is deformed first. The vehicle seat is thereby moved to the vehicle center—corresponding to the movement of the non-deformable center region. After the complete deformation of the outer region of the transverse element facing the vehicle center, the deformation of the deformable outer region facing the side skirt then takes place.

It is seen to be problematic with the known passenger car that the vehicle seat can be moved laterally only in an extremely limited manner due to the limited distance between the side skirt and the center tunnel or that the energy absorption by means of the outer regions of the transverse element—again due to the limited space ratios—can only take place to a low extent. It is accordingly necessary with such a passenger car to design it in an extremely stiff manner in order to avoid an excessive intrusion into the interior space during a crash-induced force impact due to a side collision of the passenger car. Such stiff arrangement of the motor vehicle body in the side region of the passenger cell necessary however involves considerable force peaks or acceleration peaks for the respective seat occupant, which have to be received by him.

It is thus an object of the present invention to create a passenger car of the above-mentioned type, where an improved occupant protection can be realized.

This and other objects and advantages are achieved by the passenger car according to the invention, in which the transverse element is supported at associated side skirts with respective ends. The vehicle seat is arranged in a vehicle center and can be moved with the center region after a crash-induced length reduction of the outer region facing a side impact force, whereby a crash-induced length reduction of the outer region facing away from the side impact force takes place. In other words, it is provided according to the invention that the transverse element extends over the complete width of the vehicle between or transverse to the two side skirts, wherein only one vehicle seat is associated with the transverse element, which is not arranged laterally of a center tunnel compared to the state of the art according to German patent document DE 101 43 881 B4, but rather directly in the vehicle center. This arrangement of the vehicle seat in the vehicle center first enables the renunciation of previous ideas of the body construction of passenger cars, so that the regions of the passenger cell facing the outer side can now be arranged in a corresponding resilient manner according to the invention or has an outer contour deformable over a certain length region. This is supported in the following case by the deformable outer regions of the transverse element.

A deformation sequence is thereby achieved by means of the transverse element, in which first the facing outer region is deformed with a corresponding side impact, whereafter the non-deformable center region of the transverse element is correspondingly moved away from the side impact together with the vehicle seat. Along with this moving away of the center region or of the vehicle seat, the outer region of the transverse element facing away from the side impact is now also included in the deformation sequence and correspondingly deformed or reduced in its length with energy absorption.

It can be seen that a considerable crush zone can thus be provided in the region of the side impact especially by means of the central arrangement of the side impact, wherein the vehicle seat is then moved together with the seat occupant—assuming a corresponding force impact—from the direct accident region. This movement away thereby takes place with an additional energy absorption by means of the outer region of the transverse element facing away from the side impact, which again provides that the seat occupant is impacted with relative low forces or acceleration speeds. A passenger car is thus created altogether, in which the seat occupant in the vehicle seat is included in a relatively small measure during a crash-induced force impact. Consequently, an improved occupant protection results hereby.

It is finally a further advantage of the present invention that the passenger car can be formed lighter due to the possibility for the larger deformation or intrusion of the passenger cell. As it is now possible to deform the passenger cell in its side regions by a certain amount, the measures thought to be absolutely necessary up to now for preventing a deformation or intrusion in the side region of the passenger cell can be dimensioned correspondingly smaller or be omitted altogether. The vehicle weight is thus reduced considerably.

In a further arrangement of the invention, it has furthermore been shown to be advantageous if the vehicle seat can be moved with the center region only after an at least approximately crash-induced length reduction of the outer region facing the side impact force. Hereby, a clear or stepped deformation sequence is achieved altogether, in which the outer region facing the side impact force is first deformed completely, whereafter a corresponding movement—caused by the side impact—of the non-deformable center region of the transverse element and of the vehicle seat takes place, wherein the aforesaid movement of the center element then again leads to the charge of the outer region of the transverse element facing away from the side impact force.

It has further been shown to be advantageous if the vehicle seat itself is formed as a length region of the transverse element. In other words, it is thus conceivable that parts of the transverse element—in particular of the non-deformable center region—are connected laterally to the vehicle seat itself. The vehicle seat can thereby for example be integrated into the transverse element or into the center region by means of its seat undercarriage or seat bottom region. A dual function of the seat undercarriage or of the seat bottom region results, which not only serves for holding the seat cushion part or the backrest, but also for the connection of the components of the transverse element arranged laterally of the vehicle seat or from its center region. It can be seen that a weight-beneficial arrangement of the transverse element is possible hereby. Furthermore, a simple and reliable inclusion of the vehicle seat in the transverse element results by this arrangement, so that the vehicle seat is inevitably moved out of the danger region or the impact region with a corresponding crash-induced movement of the center element.

It has further been shown to be advantageous if a minimum foot space of a rear occupant is determined by a minimum length of a respective length region of the non-deformable center tunnel region laterally of the vehicle seat. If the deformable outer region of the transverse element is thus impacted, it is ensured by the length region of the non-deformable center region (which remains at least undeformed), that the rear occupant cannot clamp his legs or feet between the side skirt moved inwards due to the accident and the vehicle seat.

It is furthermore advantageous if the transverse element is rigidly connected to the body of the passenger car. An extremely stable floor structure can thus for example be created, which has corresponding lateral deformation zones, in order to hereby permit an intrusion into the passenger cell or its deformation in a controlled manner. If the transverse element is thereby connected rigidly to the body of the motor vehicle, these deformation zones can be adjusted in a particularly advantageous and exact manner.

Alternatively, it is also conceivable that the transverse element can be integrated into the passenger car in a releasable manner. It would thereby be conceivable for example to use the vehicle seat together with the transverse element in the body of the motor vehicle that is already present, wherein the outer regions of the transverse element are then correspondingly supported at the side skirts of the body.

It is furthermore advantageous if the transverse element comprises a foot support, in particular a foot support that can be moved from a non-usage position into a usage position. An extremely comfortable and beneficial support can thus be provided for the rear occupant. A further advantage of such a foot support is that it—especially in its unfolded usage position—can be consulted additionally for supporting the transverse element. It is thereby conceivable that the foot support is partially associated with the non-deformable center region and partially with the corresponding deformable outer region of the transverse element. In other words, it would for example be conceivable to design the foot support partially deformable and partially un-deformable or more stiff, in order to reproduce the desired deformation behavior of the transverse element hereby.

Other objects, advantages and novel features of the present invention will become apparent from the following detailed description of the invention when considered in conjunction with the accompanying drawings.

DETAILED DESCRIPTION OF THE DRAWINGS

Figure 1:
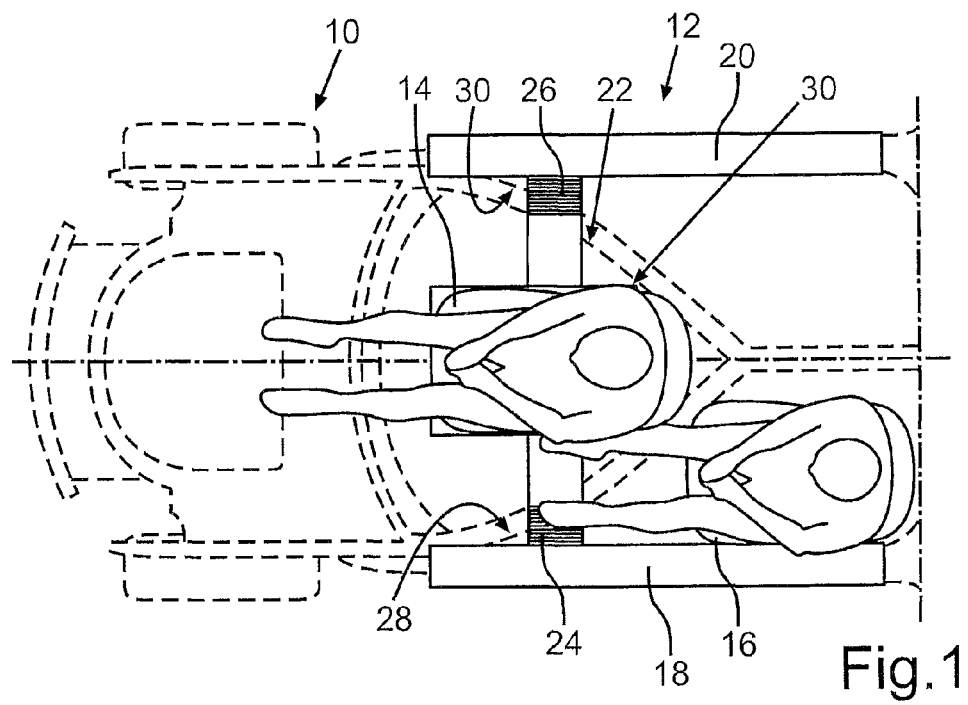
FIG. 1 is a schematic top view of the front region of a passenger car, of which a front end structure and a passenger cell can be seen, wherein a front center vehicle seat and two vehicle seats, of which only one can be seen, is provided for rear occupants, which are positioned laterally to the center front vehicle seat, wherein a transverse element can be seen, which are supported laterally to the center front vehicle seat, wherein a transverse element can be seen which is supported with respective ends at associated side skirts in the region of the passenger cell of the passenger cell, and wherein the transverse element has a non-deformable center region and deformable outer regions connected to the side skirts.
Figure 2:
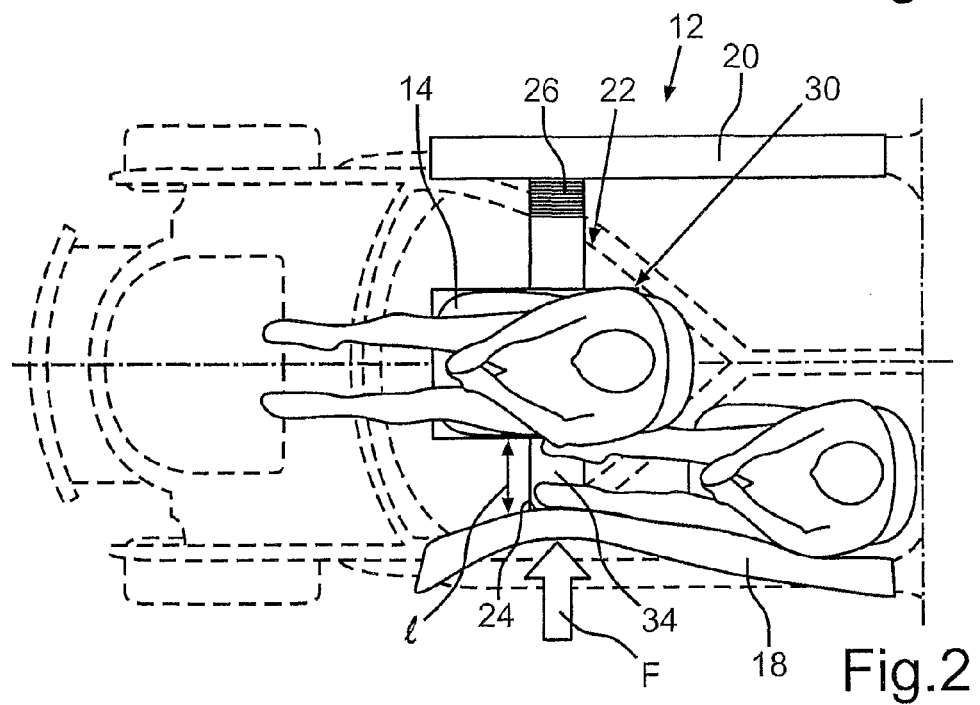
FIG. 2 is a schematic top view of the passenger car according to FIG. 1, wherein the left side skirt viewed in the forward drive direction has been impacted by a crash-induced side impact force, by means of which the outer region facing the force impact has been completely absorbed or reduced in its length.
Figure 3:
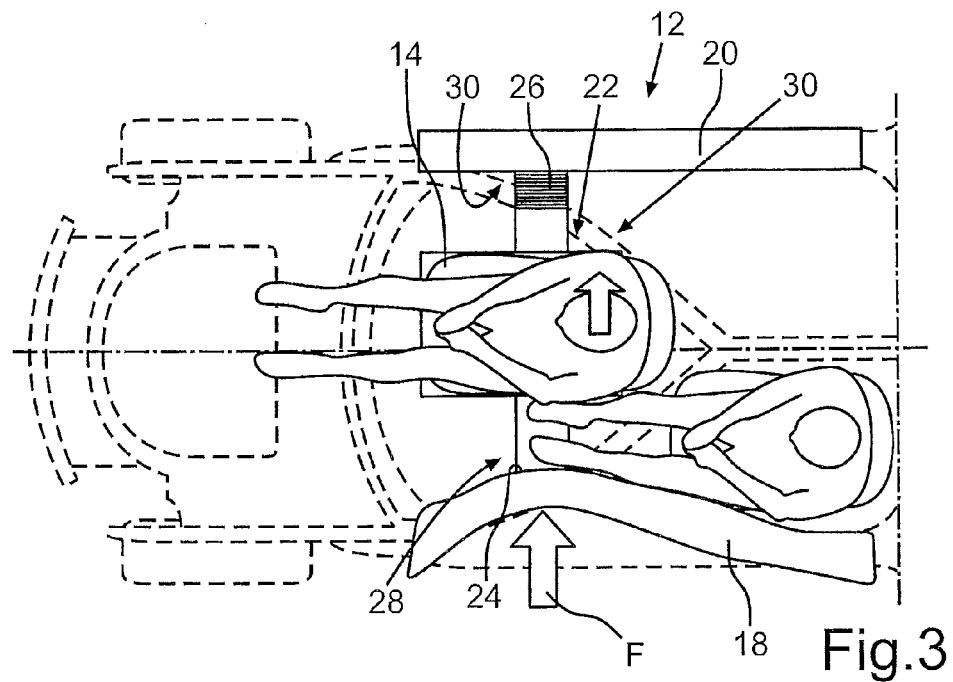
FIG. 3 is a schematic top view of the passenger car according to FIGS. 1 and 2, wherein the left side skirt has been impacted with a side impact force during the progress of the accident scenario according to FIG. 2, whereby the non-deformable center region of the transverse element has been moved away together with the vehicle seat in the force direction of the side impact force by the side impact, whereby a crash-induced length reduction or an absorption of the outer region of the transverse element facing away from the side has taken place partially.

In FIGS. 1 to 3 is respectively shown a passenger car in an extremely schematic top view and in regions according to a first embodiment. The passenger car thereby comprises a front end structure 10, which is formed as a corresponding crush zone, and a passenger cell 12 arranged behind. In the region of the passenger cell 12, a front center vehicle seat 14 with seat occupants and a rear lateral vehicle seat 16 with rear occupant are thereby shown in an extremely schematic manner. A further rear vehicle seat 16 is arranged on the right side—seen in the forward drive direction—, so that a passenger car for three persons is created presently—the driver in the front and two passengers in the rear—. As the passenger car is presently equipped with a rear engine, the front driver seat or vehicle seat 14 arranged in the front is in particular arranged relatively far to the front.

Figure 4:
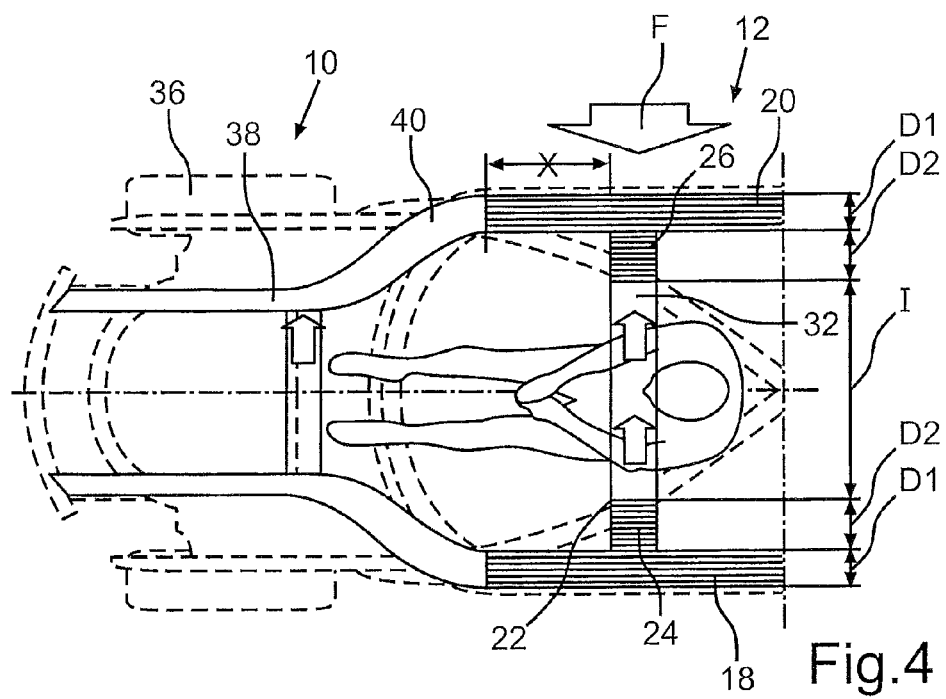
FIG. 4 is a schematic top view of the motor vehicle analogously to FIGS. 1 to 3, wherein respective lateral deformation zones and a center stiff occupant protection zone are indicated schematically.

In the region of the passenger cell 12 of the body of the passenger car extend respective side skirts 18, 20, whose special arrangement will be gone into further in connection with the arrangement form according to FIG. 4. A transverse element 22 presently extends in the transverse vehicle direction between the side skirts 18, 20. The transverse element thereby—seen in the longitudinal vehicle direction—proceeds at the height of the front vehicle seat 14. The transverse element 22 comprises respective deformable outer regions 24, 26, namely in the region of respective ends 28, 30 of the transverse element 22, by means of which it is supported at the two corresponding side skirts 18, 20.

The transverse element 22 has a center region on the inside of the outer regions 24, 26, which is largely undeformable and stiff. In other words, the center region 32 is correspondingly formed more stiff than the two outer regions 24, 26.

In the special embodiment shown in FIGS. 1 to 3, the vehicle seat 12 itself is thereby formed as part of the center length region of the transverse element 22. In other words, the transverse element 22 is interrupted in the region of the vehicle seat 14. Likewise it would of course also be conceivable to design the transverse element 22 in a continuous manner and to correspondingly fix the vehicle seat 14 at the center region 32 of the transverse element 22.

The two parts of the transverse element 22 arranged laterally of the vehicle seat 14 can presently for example be produced of a metal alloy or a plastic material. The deformable outer regions can thereby be designed in that corresponding material weaknesses such as recesses, corrugations or the like are brought into the transverse element 22. It would simultaneously also be conceivable to design the two outer-regions 24, 26 as separate elements, for example as foam elements or the like. Measures of the production of impact pots or other deformation elements in the region of the front or rear crush zone are altogether known to the expert, which can be used in such a manner.

While FIG. 1 shows the passenger car in the non-damaged or non-deformed state, an accident scenario is shown in FIGS. 2 and 3 during a side impact on the passenger vehicle.

It can thereby be seen in FIG. 2 that the left side (viewed in the forward direction) skirt 18 is or has been impacted by a side impact force F. FIG. 2 thereby shows a first phase of the introduction of the side impact force F with a corresponding side impact, whereby the laterally associated side skirt 18 has been deformed correspondingly.

Compared to the vehicle concepts usual up to now, where a side impact should essentially take place in the region of the passenger cell 12, a corresponding deformation zone is provided by the associated outer region 24 of the transverse element 22, which will be explained in more detail especially with reference to FIG. 4. It can thereby be seen from FIG. 2 that the associated outer region 24 of the transverse element 22 has been deformed due to the introduction of the side impact force F. FIG. 2 shows the point of time of the accident scenario where a maximum length reduction or deformation of the associated outer region 24 has taken place. A further deformation of the outer region 24 is thereby not possible any more.

Additionally, it can be seen from FIG. 2 that a corresponding length region 34 of the non-deformable center region 32 of the transverse element 22 has a minimum length 1, which is determined in such a manner that a minimum foot space is determined for the rear occupant sitting on the rear vehicle seat 16. In other words, the minimum length 1 of the length region 34 of the non-deformable center region is chosen in such a manner that the rear occupant does not clamp his legs or feet between the deformed side skirts 18 and the vehicle seat 14.

In FIG. 3 is now shown the further progress with a further force introduction with the side impact force F with a corresponding side impact. When—as explained in connection with FIG. 2—the outer region 24 has been completely deformed or absorbed, a side impact force-induced movement of the non-deformed center region 32 away from the side of the side impact results subsequently. As the vehicle seat 14 is integrated into the center region 32 of the transverse element 22, a movement of the vehicle seat 14 away from the impact side takes place analogously to the displacement or movement of the center region 32.

By means of the movement of the center region initiated by the side impact force F, a crash-induced length reduction of the right outer region 26 on the side of the passenger car facing away from the side impact force thereby takes place. Thus, the outer region 26 opposite the side impact force F can be deformed completely with an extensive accident, until the non-deformable center region 32 reaches the near region of the corresponding side skirt 20 with its corresponding end. If both outer regions 24, 26 are then shortened in their length or have been absorbed while absorbing energy, the length of the center region 32 forms a stiff occupant protection zone, as is already known with present-day passenger cars, where a lateral deformation zone is not provided.

The stepped stiffness of the transverse element 22, which is presently realized by the respective outer regions 24, 26 and the center region 32, could of course take place in another manner. It would be especially conceivable thereby to form the outer regions 24, 26 and the center region 32 separate from each other. It is however essential for the present invention that a stepped stiffness results thereby, so that the outer region 24 together with the associated side skirt 18 facing the side impact force F is deformed first. If however the deformations increase during a side impact to such an extent that the outer region 24 on the side of the side impact force F is absorbed completely and thus the transverse element 22 is deformed up to its hard step, the center region 32 together with the vehicle seat 14 moves in the direction of the vehicle side facing away from the side impact force F or the impact, whereby the outer region 26 on the opposite side is deformed. This deformation of course aids in that the force peaks acting on the seat occupants are diminished or eliminated. Independent of further deformations, a free space for the legs of the rear occupant sitting on the impact side remains. This happens at least until the outer region 26 facing away from the side impact force F is also deformed and then itself results in a block.

In FIG. 4 is shown a passenger car in a further extremely schematic depiction and in sections, where it can be seen that longitudinal beams 38 proceeding in the inner side of respective vehicle wheels 36 with the front end structure 10, which beams merge into the corresponding side skirt 18 or 20 in a respective associated change-over region. The specialty with the present motor vehicle body shall be seen in that the respective change-over regions 40 with the associated longitudinal beams 38 include a larger angle than is usual with conventional passenger cars. While an offset between the longitudinal beam and the associated side skirt is provided with present-day conventional motor vehicles, where the change-over region includes an angle of about 90 to 100°, the present angle between the respective change-over region 40 and the associated longitudinal beam 38 is preferably even larger than 130°, and in a special case even about 135°. Thus, change-over regions 40 result, which extends further to the rear to the side of the feet of the front seat occupant, the driver. It can be seen that this is especially favored by the center seat position of the front seat. His foot space extends towards the front at least approximately to the height of the front end of the two change-over regions 40.

Along with the longer extension of the change-over regions 40 in the longitudinal vehicle direction, towards the rear, larger side skirts 18, 20 result of course. Their distance to the respective vehicle wheel 36 is thus larger than with conventional vehicles. The shorter arrangement of the side skirts 18, 20 results by means of a lower free length X of the respective side skirt 18, 20 between its respective front end and the corresponding fastening location of the transverse element 22. This leads to an increased loading capacity of the side skirts 18, 20, so that these act in a particularly good load distribution manner. As a result, the corresponding deformation zones, which will be explained in more detail in the following, are hereby addressed in a particularly beneficial manner.

The side skirts 18, 20 thereby form a respective outer deformation zone D1. When impacting by means of a corresponding side impact force F, the deformation zone D1 is thus impacted on the side where the side impact takes place.

The transverse element 22 respectively forms a second deformation zone D2 by its outer regions 24, 26, which connects at the inner side at the respective inner deformation zone D1. The previously described deformation sequence then follows a corresponding side impact force F, namely that the outer region 26, which is arranged on the side facing the impact, is absorbed first, whereafter—due to a possible displacement of the center region—, and energy absorption or length reduction of the outer region 24 facing away from the impact takes place.

The stiff occupant protection zone I is formed by the center region 32 in the vehicle center, which zone shall remain stiff and undeformed at least to a large extent, in order to ensure a sufficient protection of injuries for the front seat occupant.

Figure 5:
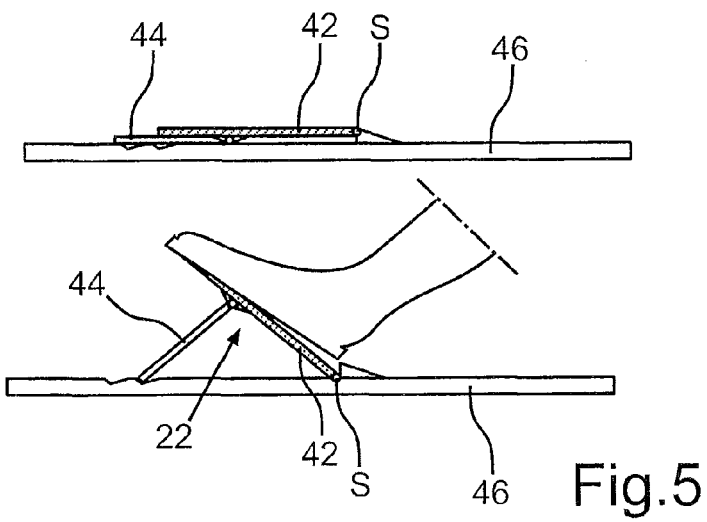
FIG. 5 is respectively a schematic side view of a foot support integrated into the transverse element, which support can be moved or pivoted from a non-usage position into a usage position.

In FIG. 5 is shown a foot support 42 in a schematic side view, which is integrated into the transverse element 22 and can presently be moved or pivoted around a pivot axis S from a non-usage position shown above into a usage position shown below. An adjusting element 44 is thereby provided below the foot support 42, by means of which the foot support 42 can be arrested in different inclination positions—depending on the wish of the seat occupant—. In the present case, the foot support 42 can thereby be folded out from a floor 46 of the passenger cell 12, so that it is largely level with the floor 46 in the state which is not folded out. In the folded-out usage position, the transverse element 22 forms with a triangular box structure in its cross region by means of the foot support 46 and the adjusting element 48.

Figure 6:
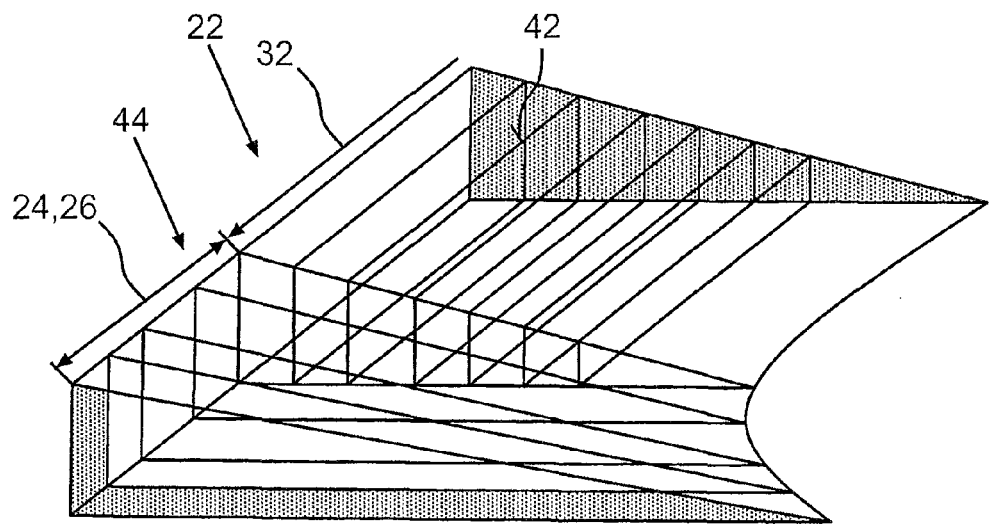
FIG. 6 is a symbolic perspective view of the foot support folded open into the usage position according to FIG. 5, which forms the associated non-deformable center region on the outer side and the non-deformable inner region on the inner side.

This box structure or the transverse element 22 is shown only shown in a symbolic depiction in FIG. 6. The foot support 42 or the plate-shaped adjustment element 44 are thereby formed in such a manner that these form the respective deformable outer region 24 or 26 on the outer side and on the inside the opposite center region 32. This can for example take place by a suitable arrangement of corresponding ends 48 in the longitudinal vehicle direction or in the transverse vehicle direction. It is however essential with this arrangement that a transverse element 22 is reached again, which is arranged on the outer side for providing the deformation zone D2 in a correspondingly energy-absorbing manner and is designed on the inside in a correspondingly stiff or non-deformable manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A passenger car comprising:
   a vehicle body;
   a vehicle seat; and
   a transverse element that is associated with the vehicle seat; wherein,
   said transverse element has a non-deformable center region and deformable outer regions, and is supported on respective ends thereof on associated body regions in the transverse direction of the vehicle;
   the respective ends of the transverse element are supported by associated side skirts; and
   the transverse element is movable along with the non-deformable center region following a crash-induced length reduction of an outer region facing a side impact force, whereby a crash-induced length reduction of the outer region facing away from the side impact force takes place.

2. The passenger car according to claim 1, wherein the vehicle seat is movable with the center region only after an at least approximately maximum length shortening of the outer region caused by the side impact force of an accident.

3. The passenger car according to claim 1, wherein the vehicle seat is itself formed as a length region of the transverse element.

4. The passenger car according to claim 1, wherein a minimum foot space of a rear passenger is determined by a minimum length of a respective length region of the non-deformable center region laterally of the vehicle seat.

5. The passenger car according to claim 1, wherein the vehicle seat is the driver's seat of the passenger car.

6. The passenger car according to claim 1, wherein the transverse element is fixedly connected to the vehicle body.

7. A passenger car according to claim 1, wherein the transverse element is releasably integratable into the passenger car.

8. A passenger car according to claim 1, further comprising a foot support that is movable from a non-usage position into a usage position, and is integrated into the transverse element.

9. A passenger car according to claim 8, wherein the foot support is partially assigned to the non-deformable center region and partially to the corresponding deformable outer region of the transverse element.

10. A passenger car comprising:
    a vehicle body;
    a vehicle seat; and
    a transverse element that is associated with the vehicle seat; wherein,
    said transverse element has a non-deformable center region and deformable outer regions, and is supported on respective ends thereof on associated body regions in the transverse direction of the vehicle;
    the respective ends of the transverse element are supported by associated side skirts;
    the vehicle seat, the non-deformable center region of the transverse element, and the deformable outer regions of the transverse element are configured such that the vehicle seat and the non-deformable center region of the transverse element move laterally in a direction away from a side impact force on the vehicle body; and
    the vehicle seat is itself formed as a length region of the transverse element.

11. The passenger car according to claim 10, wherein the vehicle seat is movable with the center region only after an at least approximately maximum length shortening of the outer region caused by the side impact force.

12. The passenger car according to claim 10, wherein a minimum foot space of a rear passenger is determined by a minimum length of a respective length region of the non-deformable center region laterally of the vehicle seat.

13. A passenger car comprising:
    a vehicle body;
    a vehicle seat; and
    a transverse element that is associated with the vehicle seat; wherein,
    said transverse element has a non-deformable center region and deformable outer regions, and is supported on respective ends thereof on associated body regions in the transverse direction of the vehicle;
    the respective ends of the transverse element are supported by associated side skirts;
    the vehicle seat, the non-deformable center region of the transverse element, and the deformable outer regions of the transverse element are configured such that the vehicle seat and the non-deformable center region of the transverse element move laterally in a direction away from a side impact force on the vehicle body; and the vehicle seat is the driver's seat of the passenger car.

14. The passenger car according to claim 10, wherein the transverse element is fixedly connected to the vehicle body.

15. The passenger car according to claim 10, wherein the transverse element is releasably integratable into the passenger car.

16. The passenger car according to claim 10, further comprising a foot support that is movable from a non-usage position into a usage position, and is integrated into the transverse element.

17. The passenger car according to claim 16, wherein the foot support is partially assigned to the non-deformable center region and partially to the corresponding deformable outer region of the transverse element.

18. The passenger car according to claim 10, wherein the vehicle seat is a front vehicle seat and the passenger car includes only one front vehicle seat.

19. The passenger car according to claim 1, wherein the vehicle seat is a front vehicle seat and the passenger car includes only one front vehicle seat.

* * * * *